(12) United States Patent
Sutcliffe et al.

(10) Patent No.: US 12,304,641 B2
(45) Date of Patent: May 20, 2025

(54) RAM-AIR DUCT SYSTEM

(71) Applicant: ROLLS-ROYCE plc, London (GB)

(72) Inventors: Graeme E F Sutcliffe, Derby (GB); Richard G Mochrie, Guilford (GB); Jade Whittle, Derby (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 18/170,604

(22) Filed: Feb. 17, 2023

(65) Prior Publication Data

US 2023/0286658 A1 Sep. 14, 2023

(30) Foreign Application Priority Data

Mar. 8, 2022 (GB) ...................................... 2203177

(51) Int. Cl.
B64D 13/06 (2006.01)
(52) U.S. Cl.
CPC ...... B64D 13/06 (2013.01); *B64D 2013/0618* (2013.01)
(58) Field of Classification Search
CPC .................. B64D 2013/0618; B64D 13/06
See application file for complete search history.

(56) References Cited

U.S. PATENT DOCUMENTS

| | | | | |
|---|---|---|---|---|
| 2,412,110 A * | 12/1946 | Williams, Jr. | ......... | B64D 13/08 62/402 |
| 4,598,355 A | 7/1986 | Shepler et al. | | |
| 5,442,905 A | 8/1995 | Claeys et al. | | |
| 5,687,561 A * | 11/1997 | Newton | ..................... | F02C 7/32 60/226.1 |
| 10,773,817 B1 * | 9/2020 | Brennen | ................ | B64D 33/02 |
| 2010/0310392 A1 | 12/2010 | Lippold et al. | | |
| 2014/0345305 A1 | 11/2014 | Sieme et al. | | |
| 2017/0275004 A1 * | 9/2017 | Bammann | ................. | F25B 9/08 |

(Continued)

FOREIGN PATENT DOCUMENTS

EP 4082910 A1 11/2022
JP H04334728 A 11/1992

OTHER PUBLICATIONS

Great Britain search report dated Aug. 30, 2022, issued in Great Britain patent application No. 2203177.7.

(Continued)

*Primary Examiner* — Ted Kim
(74) *Attorney, Agent, or Firm* — Barnes & Thornburg

(57) ABSTRACT

A ram-air duct system includes a ram-air duct configured to receive a flow of ram-air from a ram-air inlet and discharge the flow to a ram-air outlet. The system also includes a heat exchanger configured to exchange heat with air within the ram-air duct, an auxiliary air passageway and an electrically-driven air mover configured to move a flow of auxiliary air along the auxiliary air passageway for discharge into the ram-air duct through an intermediate inlet between the ram-air inlet and the ram-air outlet. The air duct system further includes a controller configured to selectively operate the ram-air duct system in an auxiliary supply mode in which the air mover and/or a control valve are controlled to cause the flow of auxiliary air to be discharged into the duct through the intermediate inlet, to thereby control a rate of heat exchange between the heat exchanger and air within the duct.

17 Claims, 5 Drawing Sheets

(56) References Cited

U.S. PATENT DOCUMENTS

2018/0237143 A1\* 8/2018 Bombled ............... B64D 13/02
2020/0130849 A1\* 4/2020 Hennig .................. B64D 13/06
2020/0346763 A1 11/2020 Defrancesco et al.
2021/0115877 A1\* 4/2021 Boyd ........................ F02C 7/18

OTHER PUBLICATIONS

European search report dated Jul. 24, 2023, issued in EP Patent Application No. 23155492.4.

\* cited by examiner

RAM-AIR DUCT SYSTEM

CROSS-REFERENCE TO RELATED APPLICATIONS

This specification is based upon and claims the benefit of priority from United Kingdom patent application number GB 2203177.7, filed on Mar. 8, 2022, which is hereby incorporated herein in its entirety.

BACKGROUND

Technical Field

The present disclosure relates to a ram-air duct system for an aircraft. The disclosure also concerns an aircraft having a ram-air duct system and optionally a propulsion device.

Description of the Related Art

It is known to cool a thermal load of an aircraft system by rejecting heat from the aircraft system to air using a ram-air duct system comprising a ram-air duct in which a heat exchanger is disposed. The ram-air duct is configured to convey a flow of air therethrough for convective heat exchange with the heat exchanger. The flow of air through the ram-air duct is driven by dynamic air pressure at an inlet of the ram-air duct owing to an airspeed of the aircraft.

It is known for the flow of air through the ram-air duct to be augmented by making use of relatively high pressure air which is bled from a high pressure section of a core of a gas turbine engine. The high pressure air is discharged into the ram-air duct via an ejector which has the effect of promoting the flow of air from the ram-air duct inlet through the ram-air duct. Bleeding high pressure air from the core of the gas turbine engine reduces its efficiency and thereby increases its fuel consumption. It is therefore desirable to provide an improved ram-air duct system.

SUMMARY

According to a first aspect of the present disclosure, there is provided a ram-air duct system for an aircraft, the ram-air duct system comprising: a ram-air duct configured to receive a flow of ram-air from a ram-air inlet and discharge the flow of ram-air to a ram-air outlet; a heat exchanger configured to exchange heat with air within the ram-air duct; an auxiliary air passageway and an electrically-driven air mover configured to move a flow of auxiliary air along the auxiliary air passageway for discharge into the ram-air duct through an intermediate inlet between the ram-air inlet and the ram-air outlet; and a controller configured to selectively operate the ram-air duct system in an auxiliary supply mode in which the air mover and/or a control valve are controlled to cause the flow of auxiliary air to be discharged into the ram-air duct through the intermediate inlet, to thereby control a rate of heat exchange between the heat exchanger and air within the ram-air duct.

It may be that the ram-air duct system is configured so that discharge of the flow of auxiliary air into the ram-air duct: augments the flow of ram-air by increasing a total mass flow rate of air through the ram-air duct; and/or promotes an increased mass flow rate of the flow of ram-air.

The intermediate inlet may be disposed upstream of the heat exchanger in the ram-air duct. It may be that the air mover comprises a compressor and/or a fan. It may be that the air mover forms part of an airframe pressurisation system configured to provide a supply of pressurised air to an airframe.

Otherwise, it may also be that the auxiliary air passageway forms part of or is connected to an airframe pressurisation system configured to provide a supply of pressurised air to an airframe; and wherein the airframe pressurisation system comprises a compressor configured to provide pressurised air for the airframe; and wherein the air mover is separate from the compressor and is configured to draw the flow of auxiliary air from the airframe pressurisation system.

The air mover may be configured to further compress air drawn from the airframe pressurisation system, for example to an elevated pressure higher than a pressure of air in the airframe pressurisation system. The air mover may be configured to receive electrical power from an electrical generator and/or an electrical energy storage device. The electrical generator may be configured to be mechanically coupled to a shaft of a propulsion device.

The controller may be configured to selectively operate the ram-air duct system in an unassisted ram-air mode in which the air mover and/or the control valve are controlled to prevent the flow of auxiliary air being discharged through the intermediate inlet. The controller may be further configured to select between operating the ram-air duct system in the auxiliary supply mode and in the unassisted ram-air mode based on a flow velocity parameter.

The flow velocity parameter may relate to a velocity of the flow of ram-air, an airspeed of the ram-air duct system (or of an airframe in which it is incorporated). The parameter may be determined by monitoring a velocity of a flow (e.g. the ram-air flow or an ambient flow) using a flow sensor (such as a Machmeter). The ram-air duct system may comprise the sensor, or the sensor may be provided externally to the ram-air duct system. The controller may receive a signal relating to the flow velocity, for example from an external system, such as an avionics system of a gas turbine engine or an aircraft to which the ram-air duct system is provided. The parameter may correspond to or define a Mach number of the flow. For example, the ram-air duct system may be provided to an airframe comprising a Machmeter configured to output a signal defining an airspeed of the airframe as a Mach number. The controller may receive the signal or a corresponding signal and may determine the parameter relating to a flow velocity based on the signal. The parameter may be the Mach number.

The controller may also be configured to: selectively operate the ram-air duct system in the auxiliary supply mode when the flow velocity parameter corresponds to an airspeed associated with the ram-air duct system being less than a first Mach number threshold; and selectively operate the ram-air duct system in the unassisted ram-air mode when the flow velocity parameter corresponds to an airspeed associated with the ram-air duct system being equal to or greater than the first Mach number threshold, wherein the first Mach number threshold is between Mach 0.4 and Mach 0.8. The first Mach number threshold may be equal to Mach 0.6.

The ram-air duct system may comprise: a ram-air inlet control device moveable between an open state in which it permits the flow of ram-air into the ram-air duct and a closed state in which it prevents a flow of ram-air through the ram-air duct; wherein the controller is configured to selectively operate the ram-air duct system in the auxiliary supply mode by: selectively operating the ram-air duct system in an open auxiliary supply mode in which the ram-air inlet control device is in the open state so that the flow of ram-air combines with the flow of auxiliary air; and selectively operating the ram-air duct system in a closed auxiliary supply mode in which the ram-air inlet control device is in the closed state.

It may be that the controller is configured to select between operating the ram-air duct system in the open auxiliary supply mode and the closed auxiliary supply mode based on a flow velocity parameter and/or a parameter relating to heat exchange at the heat exchanger.

It may also be that the controller is configured to: selectively operate the ram-air duct system in the open auxiliary supply mode when the flow velocity parameter corresponds to an airspeed associated with the ram-air duct system being less than a second Mach number threshold; and selectively operate the ram-air duct system in the closed auxiliary supply mode when the flow velocity parameter corresponds to an airspeed associated with the ram-air duct system being equal to or greater than the second Mach number threshold.

According to a second aspect o the present disclosure, there is provided an aircraft comprising an airframe and a ram-air duct system according to the first aspect, the aircraft optionally further comprising a propulsion device in which the ram-air duct is disposed.

It may be that the gas turbine engine comprises: an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft.

It may also be that: the turbine is a first turbine, the compressor is a first compressor, and the core shaft is a first core shaft; the engine core further comprises a second turbine, a second compressor, and a second core shaft connecting the second turbine to the second compressor; and the second turbine, second compressor, and second core shaft are arranged to rotate at a higher rotational speed than the first core shaft.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only with reference to the accompanying drawings, which are purely schematic and not to scale, and in which.

DETAILED DESCRIPTION

Figure 1:
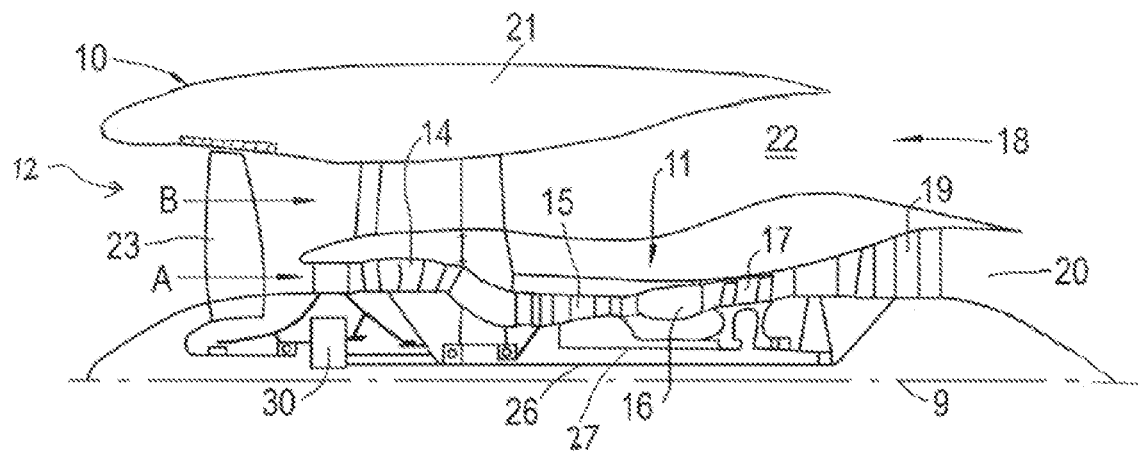
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
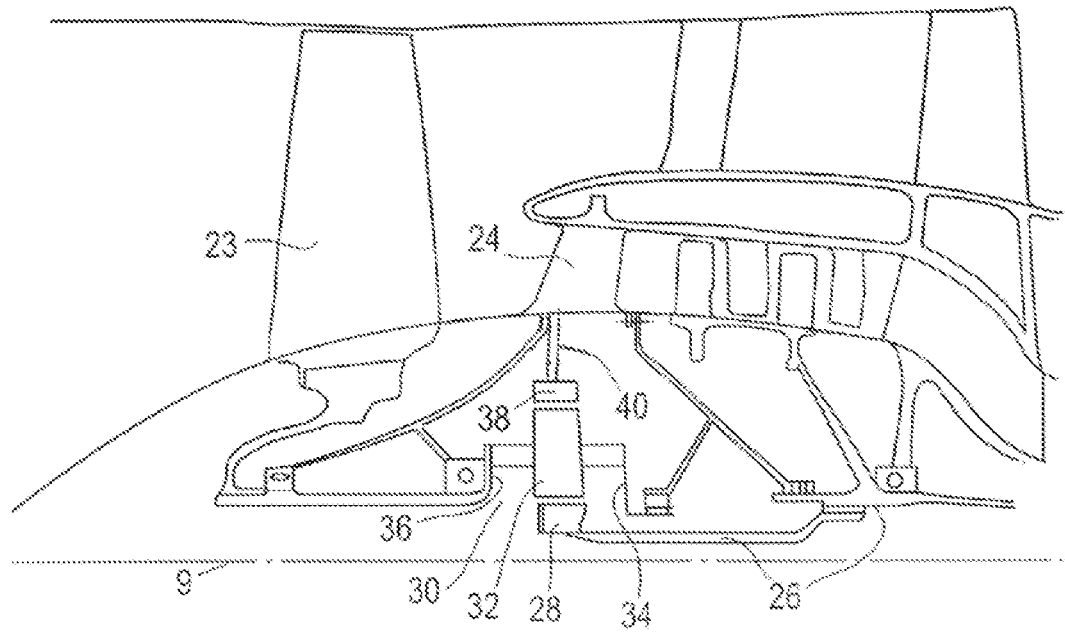
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
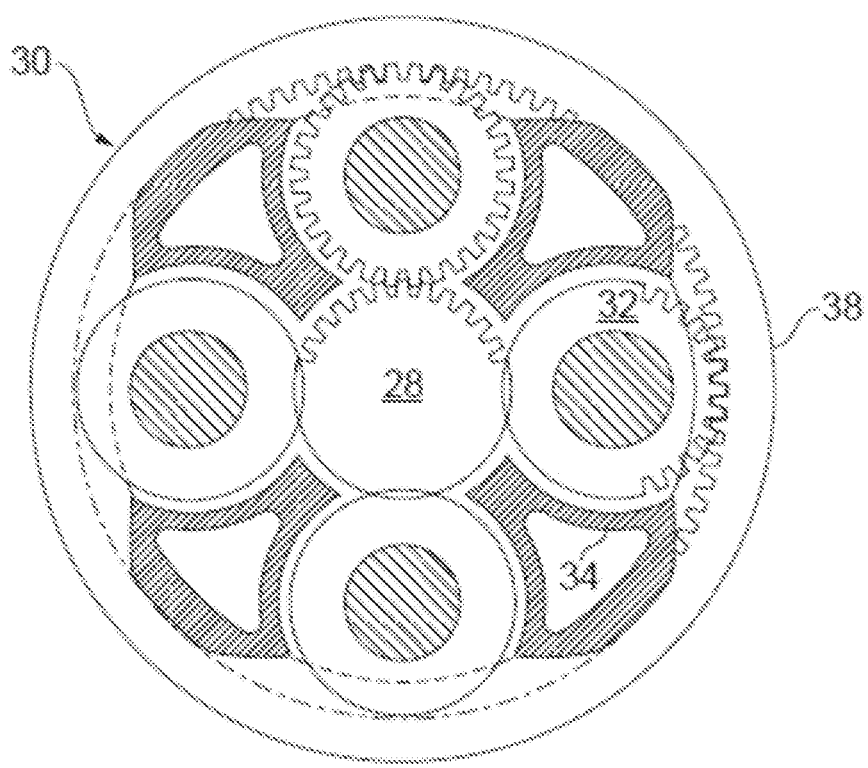
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4A:
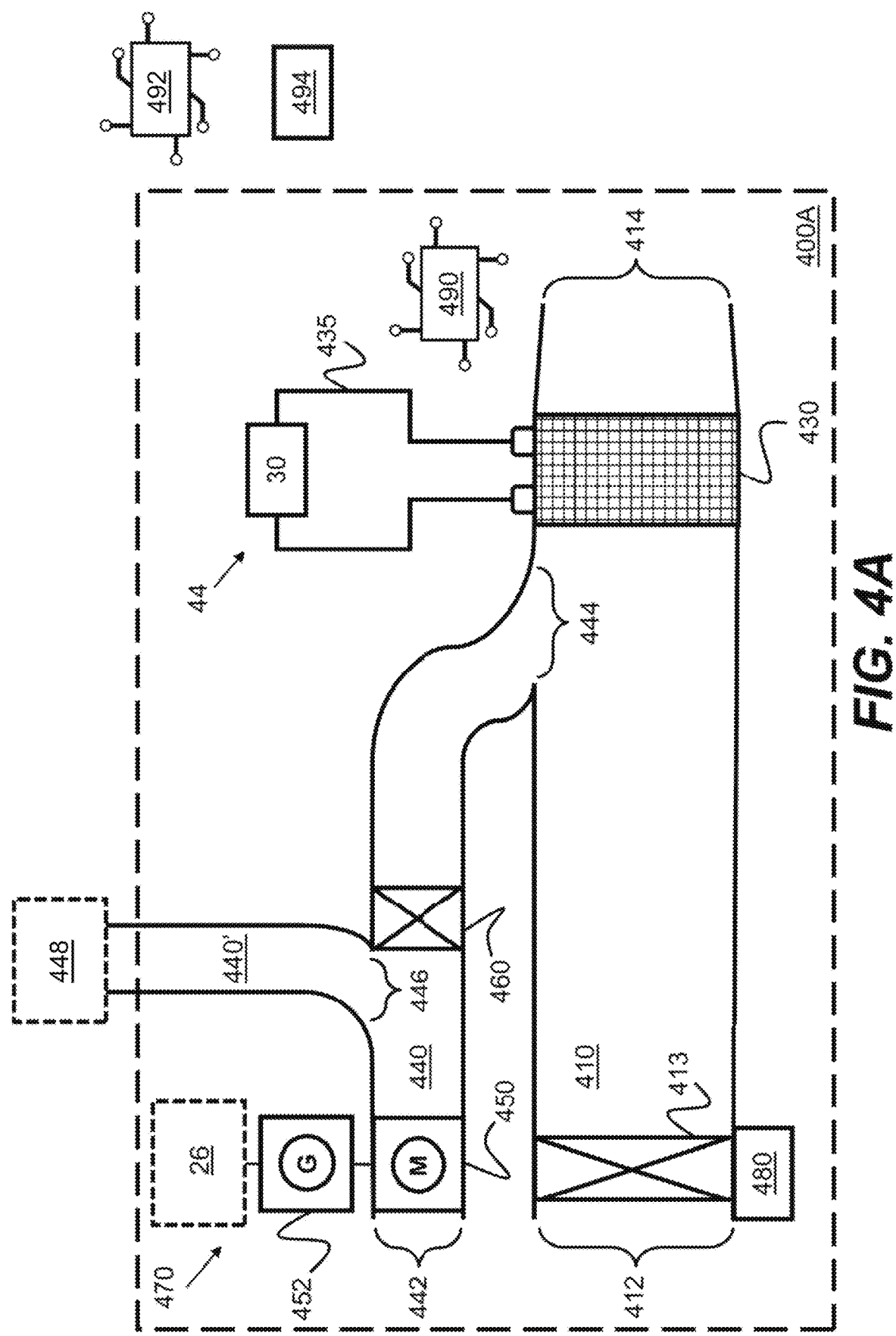
FIG. 4A is a schematic diagram of a first example ram-air duct system for an aircraft.

FIG. 4A shows a schematic diagram of a first example ram-air duct system 400A for an aircraft. The ram-air duct system 400A comprises a ram-air duct 410 configured to receive a flow of ram-air from a ram-air inlet 412 and to discharge the flow of ram-air at a ram-air outlet 414. The ram-air inlet 412 is configured to receive ambient air outside of the ram-air duct system 400A and/or outside of an aircraft in which the ram-air duct system 400A is incorporated, such that the ambient air flows into the ram-air inlet 412 to form the flow of ram-air when the ram-air duct system 400A is moving relative to the ambient air. In use, the flow of ram-air is received at a relatively high velocity corresponding to an airspeed of the ram-air duct system 400A, and so the flow of ram-air generally has a relatively high dynamic pressure. The ram-air duct 410 may be provided with a ram-air inlet control device 413 configured to selectively control (e.g. permit or prevent) a flow of ambient air into the ram-air inlet 412 to form the flow of ram-air. The ram-air inlet control device 413 may be, for example, a retractable door provided to the ram-air inlet 412. In an open state, the ram-air inlet control device 413 is configured to permit the flow of ram-air to be conveyed by the ram-air duct 410 from the ram-air inlet 412 to the ram-air outlet 414. In a closed state, the ram-air inlet control device 413 is configured to prevent the flow of ram-air from being conveyed by the ram-air duct 410 from the ram-air inlet 412 to the ram-air outlet 414.

The ram-air duct system 400A comprises a ram-air heat exchanger 430 which is configured to exchange heat with air within the ram-air duct 410. In particular, the ram-air heat exchanger 430 may be configured to reject heat from a thermal load 44 into air within the ram-air duct 410 and thereby provide cooling to the thermal load 44. For example, as shown in FIG. 4A, the thermal load 44 comprises a process fluid circuit 435 which is configured to circulate a process fluid through the ram-air heat exchanger 430. Accordingly, the ram-air heat exchanger 430 is configured to cause convective heat exchange between the process fluid within the process fluid circuit 435 and air within the ram-air duct 410.

As examples, the thermal load 44 may include a gearbox 30 of a gas turbine engine or a heat dissipating module of an aircraft to which the ram-air duct system 400A is provided, such as a power electronics module or the like. The process fluid may be a lubricant provided to a gearbox 30 of a gas turbine engine, a fuel provided by a fuel management system of a gas turbine engine or a coolant provided by a thermal management system of an aircraft or a gas turbine engine to which the ram-air duct system 400A is provided. In this way, the process fluid circuit 435 functions as a type of thermal bus between the gearbox 30 or the heat dissipating module and air within the ram-air duct.

In the example of FIG. 4A, the ram-air heat exchanger 430 is shown as being disposed entirely within the ram-air duct 410, such that air within the ram-air duct 410 flows through the ram-air heat exchanger 430 in use. However, it will be appreciated that in other examples, the ram-air heat exchanger may be disposed only partially within the ram-air duct 410, such that air within the ram-air duct 410 flows through or past the respective part the ram-air heat exchanger 430 in use for heat exchange.

The ram-air duct system 400A further comprises an auxiliary air passageway 440 and an electrically-driven air mover 450. The auxiliary air passageway 440 is provided with an auxiliary air passageway inlet 442. In a similar way to the ram-air inlet 412, the auxiliary air passageway inlet 442 may be configured to receive ambient air outside of the ram-air duct system 400A. The auxiliary air passageway inlet 442 may be configured to receive air from within or around a propulsion device to which the ram-air duct system is provided, such as a bypass duct of a gas turbine engine. The auxiliary air passageway 440 and the ram-air duct 410 are fluidically connected at an intermediate inlet 444 to the ram-air duct 410. The intermediate inlet 444 is disposed between the ram-air inlet 412 and the ram-air outlet 414 along the ram-air duct 410. The air-mover 450 is configured to move an auxiliary flow of air along the auxiliary air passageway 440 for discharge into the ram-air duct 410 through the intermediate inlet 444. The air-mover 450 is generally configured to move the auxiliary flow of air along the auxiliary air passageway 440 by increasing a velocity and/or a pressure of air within the auxiliary air passageway 440.

The air-mover 450 may comprise a fan which is configured to increase the velocity of air within the auxiliary air passageway 440 so as to move the auxiliary flow of air along the auxiliary air passageway 440. Additionally or alternatively, the air-mover 450 may comprise a compressor which is configured to increase the velocity and/or the pressure of air within the auxiliary air passageway 440 so as to move the auxiliary flow of air along the auxiliary air passageway 440.

In addition to the electrically driven air-mover 450, the ram-air duct system 400A may further comprise a control valve 460. The control valve 460 is configured to selectively permit or restrict flow of air from the auxiliary air passageway 440 to the intermediate inlet 444. For example, the control valve 460 may be operable to prevent flow of air from the auxiliary air passageway 440 to the intermediate inlet 444 such that the auxiliary flow of air is not discharged through the auxiliary air passageway 440. As will be described below, the control valve 460 may be operated to prevent such flow of air even when the air mover 450 is moving the auxiliary flow of air along the auxiliary air passageway 440, for example to an airframe 448.

The ram-air duct system 400A may further comprise a branch air passageway 440' configured to convey at least a fraction of the auxiliary flow of air from the auxiliary air passageway 440 to the airframe 448, as also shown in the example of FIG. 4A. The branch air passageway 440' is configured to receive the at least a fraction of the auxiliary flow of air from the auxiliary air passageway 440 through a branch inlet 446.

As an example of an implementation of a ram-air system, in the example of FIG. 4A the air mover 450 forms part of an airframe pressurisation system 470. In addition, the branch air passageway 440' forms part of or is connected to the airframe pressurisation system 470. The airframe pressurisation system 470 is generally configured to provide a supply of pressurised air to the airframe 448 (e.g. of an aircraft) via the branch air passageway 440'. The branch inlet 446 is located downstream of the air mover 450 and upstream of the control valve 460. The airframe pressurisation system 470 may be or form a part of a cockpit pressurisation system and/or a cabin blower system. Features of cockpit pressurisation systems and/or cabin blower systems will be known to those skilled in the art. In such examples, the ram-air duct system 400A as disclosed herein can be integrated with the airframe pressurisation system 470 so that selected components of the ram-air duct system correspond to (e.g. are) existing or conventional components of the airframe pressurisation system 470 (e.g. the air mover 450) which would otherwise be provided to an airframe for the purpose of providing the supply of pressurised air to the airframe. In particular, the air mover 450 may be configured to perform an air moving function (e.g. air conveying or air pressurisation) in the airframe pressurisation system 470, in addition to providing air for the ram-air duct. Accordingly, an additional installation mass and/or an installation volume of the ram-air duct system 400A can be reduced.

After being discharged into the ram-air duct 410 through the intermediate air inlet 444, the flow of auxiliary air moves from the intermediate air inlet 444 toward the ram-air outlet 414. If the ram-air inlet control device 413 is not present or if the ram air inlet control device 413 is in the open state, the flow of auxiliary air being discharged through the intermediate inlet 444 may increase a mass flow rate of air within the ram-air duct, thereby augmenting the flow of ram-air within the ram-air duct 410. Following discharge into the ram-air duct 410 through the intermediate air inlet 444, a mass flow rate of the auxiliary flow of air is added to a mass flow rate of the flow of ram-air such that a total mass flow rate of air through the ram-air duct 410 is increased. Although the additional mass flow rate of the flow of auxiliary air may be considered to occupy a portion of the ram-air duct, it is thought that this does not adversely affect a flow rate of ram-air into the ram-air duct. It may be that the flow rate of ram-air is maintained (or increased), and its velocity within the ram-air duct may increase owing to the additional presence of the auxiliary air flow (owing to the Venturi principle).

In this way, discharging the flow of auxiliary air through the intermediate inlet 444 and into the ram-air duct may augment the flow of ram-air through the ram-air duct 410. As shown in the example of FIG. 4A, the intermediate inlet 444 may be disposed upstream of the heat exchanger 430 in the ram-air duct 410, such that the mass flow rate of the flow of auxiliary air and the mass flow rate of the flow or ram-air within the ram-air duct 410 flow through or past the respective part the ram-air heat exchanger 430 for heat exchange therewith.

If the ram-air inlet control device 413 is not present or if the ram air inlet control device 413 is in the open state, it may be that the flow of auxiliary air being discharged through the intermediate inlet 444 has a motivating effect on the flow of ram-air through the ram-air duct 410 so as to increase the flow rate of ram-air itself (i.e. independently of the additional mass flow rate in the ram-air duct from the auxiliary air flow itself). This may be referred to as a promoting effect since the flow rate of the flow of ram-air flow is promoted or increased. The intermediate inlet 444 may be configured to interact with the flow of ram-air to cause a region of relatively lower static pressure and thereby motivate the ram-air flow (and increase the flow rate of the ram-air flow). For example, the ram-air system may be configured so that the flow of auxiliary air is provided into the ram-air duct at a relatively low static pressure, compared to the static pressure of the upstream ram-air flow. For example, the static pressure of the auxiliary air flow may be caused to be relatively lower by accelerating the auxiliary air flow (for example through a converging nozzle at the intermediate inlet 444). As is known in the art, such flow acceleration effectively converts static pressure into dynamic pressure (Bernoulli's principle). The lower static pressure of the flow of auxiliary air within the ram-air duct drives an increased flow rate of the ram-air flow owing to the pressure difference which motivates the flow of ram-air. The flow of ram-air may be entrained with, and mix with the lower static pressure auxiliary air flow within the ram-air duct. In this way, discharging the flow of auxiliary air through the intermediate inlet 444 and into the ram-air duct may motivate (e.g. promote) the flow of ram-air through the ram-air duct 410 by drawing additional ambient air into the for downstream heat exchange with the ram-air heat exchanger 430. As such, the intermediate inlet 444 and the ram-air duct 410 may be configured to cooperatively function or provide a Venturi pump or vacuum ejector when the auxiliary flow of air is being discharged through the intermediate inlet 444.

The intermediate inlet 444 does not need to be disposed upstream of the heat exchanger 430 in the ram-air duct 410 to provide the promoting effect described above. However, in examples in which the intermediate inlet 444 is disposed upstream of the heat exchanger 430 in the ram-air duct 410, discharge of the auxiliary air into the ram-air duct may both augment the flow in the ram-air duct (i.e. by providing an additional source of flow through the ram-air duct) and may also promote an increased mass flow rate of the flow of ram-air.

A rate of convective heat exchange between the ram-air heat exchanger 430 and air within the ram-air duct 410 may be dependent on: an interfacial area between the ram-air heat exchanger 430 and air within the ram-air duct 410; a heat transfer coefficient which is dependent on a velocity (e.g. a velocity distribution) of air passing over the interfacial area within the ram-air duct 410; and a temperature difference between air within the ram-air duct 410 and a respective heat rejection medium within the ram-air heat exchanger 430 (e.g. the process fluid of the thermal load circuit as described above).

Therefore, when the auxiliary flow of air is discharged through the intermediate inlet 444 and into the ram-air duct 410, the augmentation of the flow or ram-air and/or the promotion of the flow of ram-air as applicable results in the mass flow rate (and therefore the velocity) of air passing over the interfacial area between the ram-air heat exchanger 430 and air within the ram-air duct 410 being increased. In turn, the rate of convective heat exchange between the ram-air heat exchanger 430 and air within the ram-air duct 410 is increased. Therefore, discharging the flow of auxiliary air through the intermediate inlet 444 into the ram-air duct 410 may increase heat exchange between air within the ram-air duct 410 and the ram-air heat exchanger 430. Accordingly, selectively discharging the flow of auxiliary air through the intermediate inlet 444 allows the rate of convective heat exchange between the ram-air heat exchanger 430 and air within the ram-air duct 410 to be controlled.

The ram-air duct system 400A further comprises a controller 490. The controller 490 is configured to selectively control the air mover 450 and/or the control valve 460 where present to cause the auxiliary flow of air to be discharged into the ram-air duct 410 through the intermediate inlet 444 to control a rate of heat exchange between the ram-air heat exchanger 430 and air within the ram-air duct 410. As described above, discharging the flow of auxiliary air into the ram-air duct 410 may augment and/or promote the flow of ram-air through the ram-air duct 410 and thereby promote heat exchange between air within the ram-air duct 410 and the ram-air heat exchanger 430.

In examples in which the control valve 460 is not present, the controller 490 may be configured to control the air mover 450 alone to cause the auxiliary flow of air to be discharged through the intermediate inlet 444 and into the ram-air duct 410. In other examples in which the control valve 460 is present, the controller 490 may be configured to control both the air mover 450 and the control valve 460 to cause the auxiliary flow of air to be discharged through the intermediate inlet 444 and into the ram-air duct 410. When the air mover 450 forms part of an airframe pressurisation system 470 as described above, it may be that the airframe pressurisation system 470 is configured to provide a supply of pressurised air to the airframe 448 via the branch air passageway 440', for example while the auxiliary flow of air is not discharged into the ram-air duct 410 (e.g. not controlled to be discharged into the ram-air duct 410 or prevented from being discharged because no requirement for the auxiliary air flow to the ram-air duct is determined by the controller, as described further below with reference to the unassisted mode). The air mover 450 may be operated to move the auxiliary flow of air along the auxiliary air passageway 440 while the control valve 460 is controlled to prevent the flow of auxiliary air from being discharged into the ram-air duct 410 through the intermediate inlet 444. Accordingly, the air mover 450 may be operated to increase the pressure and optionally the velocity of air within the auxiliary air passageway 440 and thereby enable the airframe pressurisation system 470 to provide the supply of pressurised air to the airframe 448 without the auxiliary flow of air from being discharged into the ram-air duct 410.

In such examples, the controller 490 may be configured to control the control valve 460 alone to cause the auxiliary flow of air to be discharged through the intermediate inlet 444 while the air mover 450 is otherwise operated to increase the pressure and optionally the velocity of air within the auxiliary air passageway 440 (e.g. by a separate controller of the airframe pressurisation system 470) and thereby enable the airframe pressurisation system 470 to provide the supply of pressurised air to the airframe 448.

The ram-air duct system 400A is operable in at least an auxiliary supply mode and an unassisted ram-air mode. In the auxiliary supply mode, the air mover 450 and/or the control valve 460 cause the flow of auxiliary air to be discharged through the intermediate inlet 444. Where there is a flow of ram-air in the rami-air duct, the discharge of the flow of auxiliary air may augment flow in the ram-air duct and/or promote the flow of ram-air in the duct as described above. In the unassisted ram-air mode, the air mover 450 and/or the control valve 460 do not cause the flow of auxiliary air to be discharged through the intermediate inlet 444. Further, the flow of auxiliary air may be actively prevented from being discharged through the intermediate inlet 444 in the unassisted ram-air mode of the ram-air duct system 400A, for example by actuation of the control valve 460 to prevent such flow.

In examples in which the ram-air inlet control device 413 is present, the auxiliary supply mode may be implemented by two modes (e.g. sub-modes) of operation. In particular, the ram-air duct system 400A may be operable in a closed auxiliary supply mode and an open auxiliary supply mode. In the closed auxiliary air mode, the air mover 450 and/or the control valve 460 cause the flow of auxiliary air to be discharged through the intermediate inlet 444 while the ram-air inlet control device 413 is in the closed state such that the flow of ram-air is not conveyed through the ram-air duct 410. It may be that the flow of auxiliary air provides a rate of heat exchange between the ram-air heat exchanger 430 and the auxiliary flow of air to meet a cooling demand of the thermal load 44, such that the flow of ram-air is not required and the rate of convective heat exchange between the ram-air heat exchanger 430 and air within the ram-air duct 410 may be controlled using the flow of auxiliary air alone. Closing the ram-air inlet control device 413 may reduce a total drag force of the ram-air duct system 400A (or the airframe or propulsion device in which it is incorporated). Consequently, operating the ram-air duct system 400A in the closed auxiliary supply mode is associated with an improved flight performance of the ram-air duct system 400A in use.

In the open auxiliary supply mode, the ram-air inlet control device 413 is in the open state such that the flow of ram-air combines with the flow of auxiliary air as described above with reference to the auxiliary supply mode.

The controller 490 may be configured to select between operating the ram-air duct system 400A in the auxiliary supply mode and the unassisted ram air mode based on one or monitored parameters. For operation in the auxiliary supply mode, the controller may be configured to select between operating the ram-air duct system 400A in the open auxiliary supply mode and in the closed auxiliary supply mode based on one or more monitored parameters (which may be the same or different as are monitored for selection between the auxiliary supply mode and the unassisted ram air mode).

The one or more monitored parameter may be any suitable parameter relevant to operation of the ram-air-duct system, and in particular relevant to heat transfer at the heat exchanger. For example, the monitored parameter may be a flow velocity parameter relating to the ram-air duct system, such as an airspeed or a speed of flow through the ram-air duct (e.g. at the ram-air inlet or elsewhere along the duct), a temperature of the flow of ram-air, a pressure of the flow of ram-air. The monitored parameter may relate to the thermal load, for example it may be a temperature of a component in the thermal load, or of a cooling fluid (e.g. refrigerant) of the thermal load. The ram-air system may comprise one or more suitable sensors for monitoring such parameters, for example one or more of: a flow sensor, a temperature sensor, and a pressure sensor at respective monitoring locations. An example location of such a sensor is shown with reference numeral 480.

By way of example, the controller 490 may be configured to control the air mover 450 and/or the control valve 460 to cause the flow of auxiliary air to be discharged into the ram air duct 410 (i.e. to select the auxiliary supply mode) based on a flow velocity parameter, such as a Mach number associated with the flow of ram-air. The Mach number associated with the flow of ram-air may be a Mach number associated with the airspeed of a propulsion device or an airframe to which the ram-air duct system 400A is provided. For instance, an external controller 492 or a machmeter 494 may determine the Mach number associated with the flow of ram-air based at least in part on signals received from an airspeed sensor such as a static-pitot tube disposed on or within a propulsion device or disposed on or within an airframe to which the ram-air duct system 400A is provided. The external controller 492 or the machmeter 494 may be incorporated within a propulsion device (such as a gas turbine engine) or an airframe to which the ram-air duct system 400A is provided and may form part of an avionics system of the gas turbine engine or the airframe.

The controller 490 may be configured to maintain the ram-air duct system 400A in the assisted ram-air mode in response to a determination that the Mach number is less than a Mach number threshold. Conversely, in response to a determination that the Mach number associated with the flow of ram-air is equal to or greater than the Mach number threshold, the controller 490 may be further configured to maintain the ram-air duct system 400A in the unassisted ram-air mode. The Mach number threshold may be selected so that the ram-air duct system 400A is only operated in the auxiliary supply mode (e.g. the open auxiliary supply mode) in conditions corresponding to the auxiliary air providing a significant impact on the heat exchange, for example by virtue of the augmenting and/or promoting effect described above. The inventors have found that for a ram-air duct system as disclosed herein, an effectiveness with which the heat exchanger 430 may exchange heat with air within the ram-air duct 410 in the unassisted ram-air mode is significantly reduced when the Mach number associated with the flow of ram-air is less than a Mach number threshold between Mach 0.4 and Mach 0.8. The Mach number threshold may be between Mach 0.5 and Mach 0.7. The Mach number threshold may be approximately Mach 0.6.

The controller 490 may be configured to select between operating the ram-air duct system 400A in the open auxiliary supply mode and operating the ram-air duct system 400A in the closed auxiliary supply mode based on one or monitored parameters as described above. It may be that in some operating conditions a cooling demand can be met by the flow of auxiliary air in the absence of the flow of ram-air, and/or the flow of ram-air may be relatively low such that it is preferable to operate in the closed auxiliary supply mode and avoid a drag penalty of the ram-air flow, rather than operate in the unassisted mode or open auxiliary supply mode. For example, a monitored parameter may be a flow velocity parameter corresponding to the Mach number as described above. Selection between operating in the open auxiliary mode and the closed auxiliary mode may be based on a second Mach number threshold, which may be the same or different as the Mach number threshold discussed above. In particular, the second Mach number threshold may be lower than the first Mach number threshold. For example, if the Mach number threshold is approximately Mach 0.6, the second Mach number threshold may be approximately Mach 0.4. Additionally or alternatively, selection between operating in the open auxiliary mode and the closed auxiliary mode may be based on one or more other monitored parameters as described above.

In the example of FIG. 4A, the air mover 450 is electrically connected to an electrical generator 452 and is therefore configured to receive electrical power from the electrical generator 452. The electrical generator 452 is generally configured to convert mechanical power into electrical power. In general, the electrical generator 452 may be coupled to or configured to be coupled to an engine or a turbine and therefore convert mechanical power delivered by the engine or the turbine into electrical power for supply to the air mover 450. For example, the electrical generator 452 may be configured to be mechanically coupled to an auxiliary power unit (APU) of an airframe 448 to which the ram-air duct system 400A is provided. Otherwise, the electrical generator 452 may be configured to be mechanically coupled to a spool 26 of a gas turbine engine to which the ram-air duct system 400A is provided, as shown in the example of FIG. 4A. Nevertheless, it will be appreciated that the air-mover 450 of the first example ram-air duct system 400A may otherwise be configured to receive electrical power, as discussed below with reference to FIG. 4B.

In previously-considered systems, energy required to control a rate of heat exchange between a ram-air heat exchanger and air within a ram-air duct may be derived from a compressor of a gas turbine engine by bleeding relatively high pressure bleed air from a core of the gas turbine engine and/or from a bypass duct of the gas turbine engine and ejecting the relatively high pressure bleed air into the ram-air duct using an ejector device. However, bleeding high pressure air from the core of the gas turbine engine reduces its efficiency and thereby increases its fuel consumption as well as reducing a thrust provided by the gas turbine engine.

In examples of the ram-air duct system 400A in which the air-mover 450 is electrically connected to the electrical generator 452 and the electrical generator 452 is configured to receive mechanical power from the spool 26 of the gas turbine engine, energy required to control a rate of heat exchange between the ram-air heat exchanger 430 and air within the ram-air duct 410 is indirectly derived from the gas turbine engine via the electrical generator 452. The ram-air duct system 400A is therefore able to receive energy for controlling the rate of heat exchange between the heat exchanger 430 and air within the ram-air duct 410 from the gas turbine engine without bleeding air from a core and/or a bypass duct of the gas turbine engine, which is associated with fuel efficiency and/or thrust performance advantages of the gas turbine engine. In addition, a total installation mass and/or a total installation volume of the ram-air duct system 400A may be lower than a previously-considered system which comprises an ejector device and other apparatus for bleeding air from the gas turbine engine.

Figure 4B:
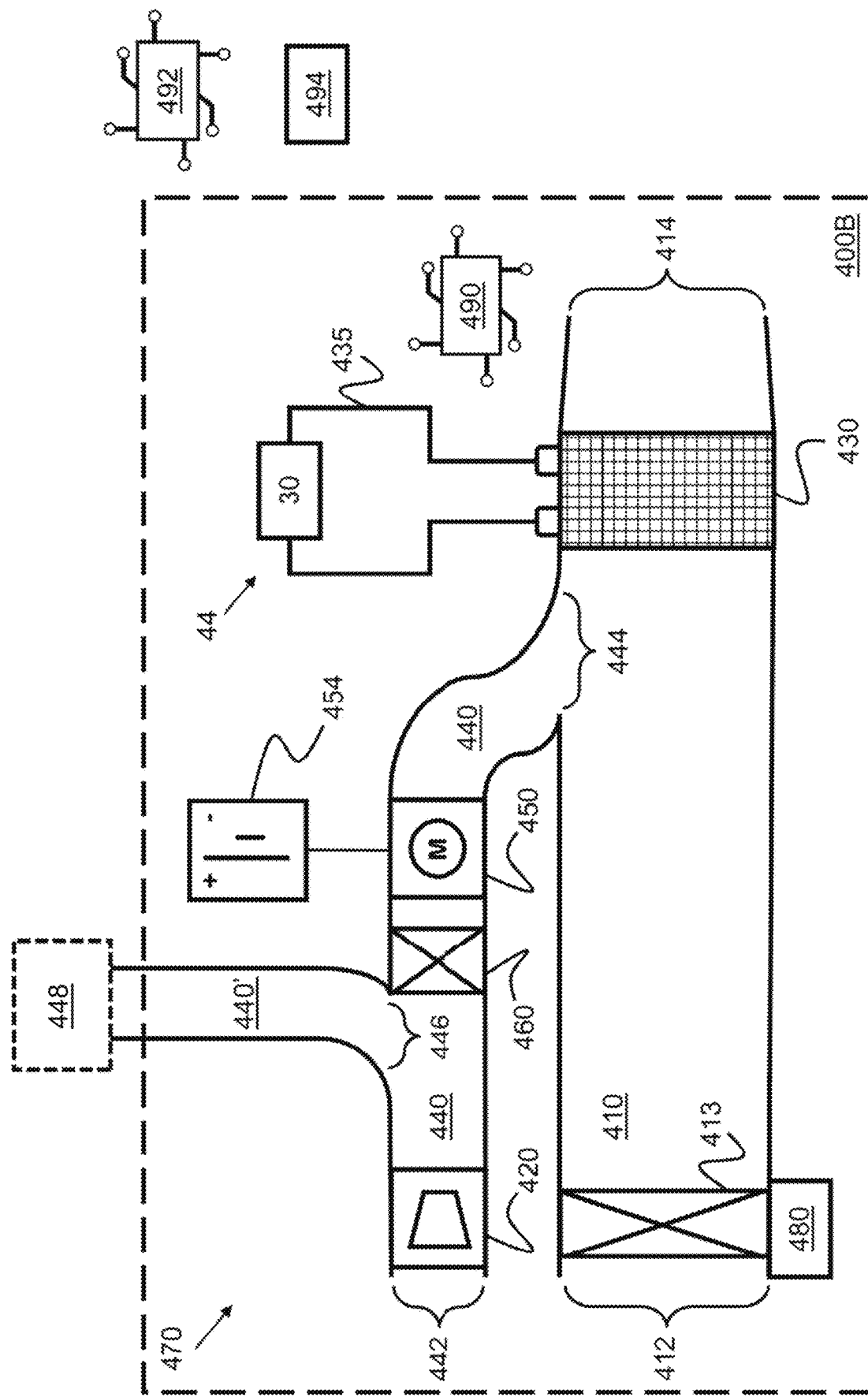
FIG. 4B is a schematic diagram of a second example ram-air duct system for an aircraft.

FIG. 4B shows a schematic diagram of a second example ram-air duct system 400B for an aircraft. The second example ram-air duct system 400B is generally similar to the first example ram-air duct system 400A described above with reference to FIG. 4A, with like reference numerals indicating common or similar features.

In contrast to the first example ram-air duct system 400A, the auxiliary air passageway 440 forms part of or is connected to the airframe pressurisation system 470. As described above with reference to the first example ram-air duct system 400A and FIG. 4A, the branch air passageway 440' forms part of or is connected to the airframe pressurisation system 470 and the airframe pressurisation system 470 is generally configured to provide a supply of pressurised air to the airframe 448 via the branch air passageway 440'. However, in the second example ram-air duct system 400B, the airframe pressurisation system 470 comprises a compressor 420 configured to provide pressurised air for the airframe 448. The air mover 450 is separate from the compressor 420 and is configured to draw the auxiliary flow of air from the air pressurisation system 470 (e.g. along the auxiliary air passageway 440 of the air pressurisation system 470). The branch inlet 446 is located downstream of the compressor 420 and upstream of the control valve 460.

In a similar way to the first example air pressurisation system 400A, the second example ram-air duct system 400B makes use of components of the airframe pressurisation system 470 (e.g. the auxiliary air passageway 440 and/or the compressor 420) which would otherwise be provided to an airframe for the purpose of providing the supply of pressurised air to the airframe. Accordingly, an additional installation mass and/or an installation volume of the ram-air duct system 400B is reduced.

The air mover 450 may be configured to further pressurise air from the air pressurisation system 470 in addition to the pressurisation provided by the compressor 420, or to draw the flow from the auxiliary air passageway 440 towards the intermediate inlet 444 (i.e. without additional pressurisation). For example, the compressor 420 may be configured to pressurise air within the air pressurisation system 470 to a first pressure for supply to the airframe 448. The air mover 450 may be configured to further pressurise air from the air pressurisation system to an elevated second pressure for discharge into the ram-air duct 410, wherein the second pressure is higher than the first pressure. It may be that in some implementations the higher second pressure is required in order to convey a suitable flow rate of auxiliary air into the ram-air duct. The first pressure may be, for instance, approximately 1 bar or 1 atm and the second pressure may be greater than 1 bar or 1 atm.

In the example of FIG. 4B, the air mover 450 is electrically connected to an electrical energy storage device 454 and is therefore configured to receive electrical power from the electrical energy storage device 454. The electrical energy storage device 454 may be, for example, a cell battery. However, it will be appreciated that the air-mover 450 of the second example ram-air duct system 400B may otherwise be configured to receive electrical power, as discussed above in respect of the air mover 450 of the first example ram-air duct system 400A and with reference to FIG. 4A.

In examples in which the air mover 450 is configured to receive power from an electrical energy storage device 454, the ram-air duct system 400B is more suitable for use with aircraft which have a high degree of electrification (which may alternatively be referred to as a hybrid-powered aircraft or electrically-powered aircraft). An aircraft with a high degree of electrification may be an aircraft which has a propulsion system which derives a significant amount of power from electrical power sources such as cell batteries, supercapacitors, fuel cells and the like. An aircraft with a high degree of electrification may otherwise have a propulsion system which does not derive power from any thermal power sources such as a reciprocating internal combustion engine, a gas turbine engine or any other type of combustion engine. Otherwise, an aircraft with a high degree of electrification may have a propulsion system which derives at least some power from thermal power sources (i.e. combustion power sources). Thermal power sources incorporated in the propulsion systems of such aircraft may be relatively small in terms of both installation size and power output, such that availability of non-electrical power is limited during operation of the aircraft. For such aircraft, the ram-air duct system 400A is associated with an improved operational efficiency and range, because the energy required to control the rate of heat exchange between the heat exchanger 430 and air within the ram-air duct 410 is derived from electrical power sources.

Figure 5:
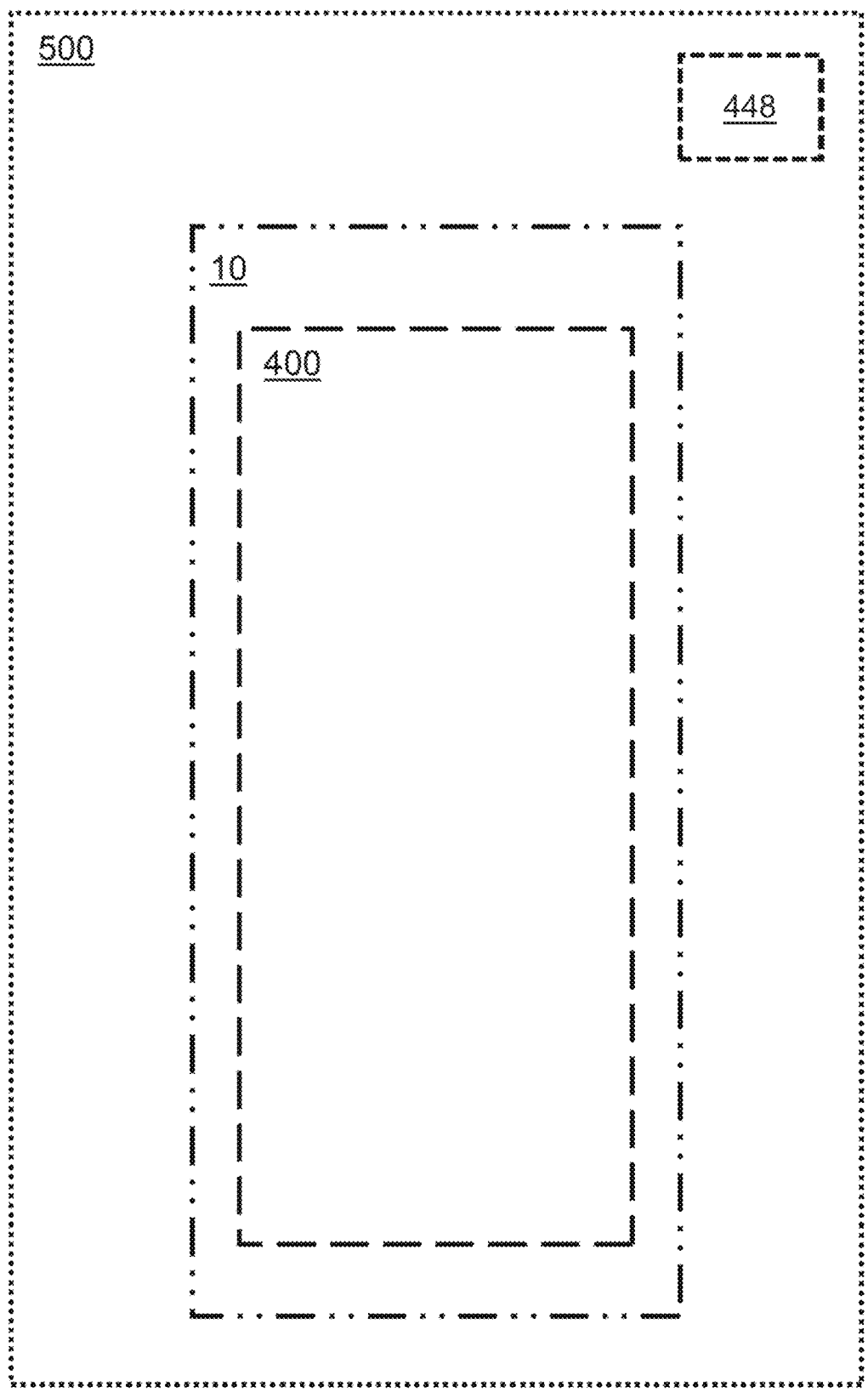
FIG. 5 is a schematic diagram of an example aircraft comprising an airframe and a ram-air duct system.

FIG. 5 shows a highly schematic diagram of an example aircraft 500 to illustrate a hierarchy of systems. The example aircraft 500 comprises an airframe 448 and a ram-air duct system 400. The ram-air duct system 400 is in accordance with either the first example ram-air duct system 400A described with respect to FIG. 4A or in accordance with the second example ram-air duct system 400B described above with respect to FIG. 4B. In examples of the ram-air duct system 400 wherein the air mover 450 forms part of an airframe pressurisation system 470 or in examples of the ram-air duct system 400 wherein the auxiliary air passageway 440 forms part of or is connected to an airframe pressurisation system 470, the airframe pressurisation system 470 is configured to provide the supply of pressurised air to the airframe 448 via the branch air passageway 440'. This disclosure envisages that the air pressurisation system 470 can be wholly or partially disposed within the airframe 448.

In the example of FIG. 5, the aircraft 500 further comprises a gas turbine engine 10 or another propulsion device 10 in which the ram-air duct 410 of the ram-air duct system 400 is disposed. It may be that the air pressurisation system 470 is partially disposed within the propulsion device 10. If the propulsion device is a gas turbine engine, it may be in accordance with the gas turbine engine 10 described above with respect to FIGS. 1 to 3. For example, the ram-air duct 410 may be incorporated at least partly in a nacelle of the propulsion device. In still further examples, the aircraft 500 may not comprise a gas turbine engine. The disclosure envisages that a ram-air duct system as disclosed herein may be incorporated directly within an airframe rather than wholly or partially within a propulsion device.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. The scope of protection is defined in the appended claims.

What is claimed is:

1. A ram-air duct system for an aircraft, comprising:
a ram-air duct configured to receive a flow of ram-air from a ram-air inlet and discharge the flow of ram-air to a ram-air outlet, the ram-air duct formed to include an intermediate inlet that opens into the ram-air duct and is located between the ram-air inlet and the ram-air outlet;
a heat exchanger located within the ram-air duct and configured to exchange heat with air within the ram-air duct;
an auxiliary air passageway fluidly connected with the intermediate inlet to conduct a flow of pressurized auxiliary air into the ram-air duct, the intermediate inlet comprising an opening formed in an outer wall of the ram-air duct, the auxiliary air passageway terminating at the intermediate inlet;
a branch passage fluidly connected with the auxiliary air passageway and an airframe of an aircraft to direct a portion of the flow of pressurized auxiliary air to the airframe, the auxiliary air passageway connected with the auxiliary air passageway via a branch inlet, the branch inlet disposed upstream of the intermediate inlet;
a compressor located in the auxiliary air passageway upstream of the branch inlet and configured to provide the pressurised auxiliary air to the airframe;
an electrically-driven air mover disposed in the auxiliary air passageway downstream of the compressor and the branch inlet and configured to draw the flow of the pressurised auxiliary air from an auxiliary air passageway inlet and along the auxiliary air passageway and to discharge the flow of the pressurised auxiliary air into the ram-air duct through the intermediate inlet between the ram-air inlet and the heat exchanger; and
a controller configured to selectively operate the ram-air duct system in an auxiliary supply mode in which the air mover and/or a control valve are controlled to cause the flow of auxiliary air to be discharged into the ram-air duct through the intermediate inlet, to thereby control a rate of heat exchange between the heat exchanger and air within the ram-air duct.

2. The ram-air duct system according to claim 1, wherein the ram-air duct system is configured so that discharge of the flow of auxiliary air into the ram-air duct performs at least one of the following:

augments the flow of ram-air by increasing a total mass flow rate of air through the ram-air duct; and promotes an increased mass flow rate of the flow of ram-air.

3. The ram-air duct system according to claim 1, wherein the intermediate inlet is disposed upstream of the heat exchanger in the ram-air duct.

4. The ram-air duct system according to claim 1, wherein the air mover comprises at least one of a compressor and a fan.

5. The ram-air duct system according to claim 1, wherein the air mover is configured to receive electrical power from at least one of an electrical generator and an electrical energy storage device.

6. The ram-air duct system according to claim 5, wherein the electrical generator is configured to be mechanically coupled to a shaft of a propulsion device.

7. The ram-air duct system according to claim 1, wherein the controller is configured to selectively operate the ram-air duct system in an unassisted ram-air mode in which at least one of the air mover and the control valve are controlled to prevent the flow of auxiliary air being discharged through the intermediate inlet.

8. The ram-air duct system according to claim 7, wherein the controller is configured to select between operating the ram-air duct system in the auxiliary supply mode and in the unassisted ram-air mode based on a flow velocity parameter.

9. The ram-air duct system according to claim 8, wherein the controller is configured to:
selectively operate the ram-air duct system in the auxiliary supply mode when the flow velocity parameter corresponds to an airspeed associated with the ram-air duct system being less than a first Mach number threshold; and
selectively operate the ram-air duct system in the unassisted ram-air mode when the flow velocity parameter corresponds to an airspeed associated with the ram-air duct system being equal to or greater than the first Mach number threshold,
wherein the first Mach number threshold is between Mach 0.4 and Mach 0.8.

10. The ram-air duct system according to claim 1, comprising:
a ram-air inlet control device moveable between an open state in which the ram-air inlet control device permits the flow of ram-air into the ram-air duct and a closed state in which the ram-air inlet control device prevents a flow of ram-air through the ram-air duct;
wherein the controller is configured to selectively operate the ram-air duct system in the auxiliary supply mode by:
selectively operating the ram-air duct system in an open auxiliary supply mode in which the ram-air inlet control device is in the open state so that the flow of ram-air combines with the flow of auxiliary air; and
selectively operating the ram-air duct system in a closed auxiliary supply mode in which the ram-air inlet control device is in the closed state.

11. The ram-air duct system according to claim 10, wherein the controller is configured to select between operating the ram-air duct system in the open auxiliary supply mode and the closed auxiliary supply mode based on at least one of a flow velocity parameter and a parameter relating to heat exchange at the heat exchanger.

12. The ram-air duct system according to claim 11, wherein the controller is configured to:

selectively operate the ram-air duct system in the open auxiliary supply mode when the flow velocity parameter corresponds to an airspeed associated with the ram-air duct system being less than a second Mach number threshold; and
selectively operate the ram-air duct system in the closed auxiliary supply mode when the flow velocity parameter corresponds to an airspeed associated with the ram-air duct system being equal to or greater than the second Mach number threshold.

13. An aircraft comprising an airframe and a ram-air duct system according to claim 1, further comprising a propulsion device in which the ram-air duct is disposed.

14. The ram-air duct system according to claim 1 further comprising:
a duct wall of the ram-air duct, the duct wall having
an upstream duct wall portion extending from the ram-air inlet to the intermediate inlet, and
a downstream duct wall portion extending from the intermediate inlet to the ram-air outlet, wherein the auxiliary air passageway intersects the ram-air duct; and
a passageway wall of the auxiliary air passageway, the passageway wall having
a first wall portion extending from the auxiliary air passageway inlet to the intermediate inlet and intersecting the upstream duct wall portion at an intersection point, the first wall portion and the upstream duct wall portion both terminating at the intersection point, and
a second wall portion, the second wall portion opposite the first wall portion and extending from upstream of the intermediate inlet and intersecting the downstream duct wall portion at the intermediate inlet.

15. A ram-air duct system for an aircraft, comprising:
a ram-air duct assembly that includes a duct outer wall forming a ram-air duct, the ram-air duct configured to receive a flow of ram-air and a heat exchanger located in the ram-air duct and configured to exchange heat with air within the ram-air duct to reject heat from a thermal load into the flow of the ram-air, the ram-air duct having a ram-air inlet, a ram-air outlet disposed downstream of the ram-air inlet, and an intermediate inlet formed by an opening in the outer wall and disposed along the ram-air duct between the ram-air inlet and the heat exchanger and opening into the ram-air duct to conduct a flow of pressurized auxiliary air into the ram-air duct;
an auxiliary air passageway fluidly connected with the intermediate inlet and configured to conduct selectively the flow of pressurised auxiliary air to the ram-air duct, the auxiliary air passageway including an air passage formed by a passage outer wall, a downstream end of the passage outer wall coupled to and terminating at the opening in the duct outer wall of the ram-air duct, the air passage extending from an auxiliary air passageway inlet to the intermediate inlet, a compressor located in the air passage to draw selectively the flow of pressurised auxiliary air from the auxiliary air passageway inlet, a branch passage formed by a branch outer wall, fluidly coupled with the air passage and an airframe of an aircraft to direct a portion of the flow of pressurized auxiliary air to the airframe, the branch passage coupled to and terminating at a branch inlet formed by an opening in the passage outer wall, the branch inlet disposed along the passage outer wall between the auxiliary air passageway inlet and the intermediate inlet, an upstream end of the branch outer wall coupled to and terminating at the opening in the passage outer wall, and an air mover system located in the air passage downstream from the compressor to direct the flow of pressurized auxiliary air toward the ram-air duct, the branch passage connected with the air passage via a branch inlet disposed downstream of the compressor and upstream of the air mover; and a controller programmed to operate the air mover system such that the flow of the pressurised auxiliary air is blocked from being discharged into the ram-air duct through the intermediate inlet in response to a flow velocity parameter indicative of an airspeed in the ram-air duct system being equal to or greater than a Mach number threshold and to operate the air mover to cause the flow of pressurised auxiliary air to be discharged into the ram-air duct through the intermediate inlet in response to the flow velocity parameter indicative of an airspeed associated with the ram-air duct system being less than the Mach number threshold to assist the ram-air duct assembly and improve heat rejection of the heat exchanger.

16. The ram-air duct system according to claim 15, wherein the passage outer wall comprises an upstream passage wall portion extending from the auxiliary air passageway inlet to the branch inlet and a downstream passage wall portion extending from the branch inlet to the intermediate inlet, wherein the branch passage intersects the air passage, and wherein the branch outer wall comprises a first wall portion extending between the airframe and the branch inlet and intersecting the downstream passage wall portion at an intersection point, the first wall portion and the downstream passage wall portion both terminating at the intersection point, and a second wall portion opposite the first wall portion and extending between the airframe and the branch inlet, past the branch inlet, and forming part of the upstream passage wall portion.

17. The ram-air duct system according to claim 15, wherein the duct outer wall comprises an upstream duct wall portion extending from the ram-air inlet to the intermediate inlet and a downstream duct wall portion extending from the intermediate inlet to the ram-air outlet, wherein the auxiliary air passageway intersects the ram-air duct, and wherein the outer passage wall comprises a first wall portion extending from the auxiliary air passageway inlet to the intermediate inlet and intersecting the upstream duct wall portion at an intersection point, the first wall portion and the upstream duct wall portion both terminating at the intersection point, and a second wall portion opposite the first wall portion and extending from upstream of the intermediate inlet, past the intermediate inlet, and forming the part of the downstream duct wall portion.

* * * * *